United States Patent
Kozlov

(10) Patent No.: US 8,593,727 B2
(45) Date of Patent: Nov. 26, 2013

(54) SINGLE-SHOT LASER ABLATION OF A METAL FILM ON A POLYMER MEMBRANE

(76) Inventor: Vladimir G. Kozlov, Eugene, OR (US)

( * ) Notice: Subject to any disclaimer, the term of this patent is extended or adjusted under 35 U.S.C. 154(b) by 127 days.

(21) Appl. No.: 13/093,683

(22) Filed: Apr. 25, 2011

(65) Prior Publication Data
US 2012/0268817 A1    Oct. 25, 2012

(51) Int. Cl.
G02B 5/30    (2006.01)
G02B 27/28    (2006.01)
B23K 26/00    (2006.01)

(52) U.S. Cl.
USPC ............... 359/352; 359/485.05; 219/121.6; 219/121.61; 219/121.69

(58) Field of Classification Search
USPC ............ 359/352; 219/121.6, 121.61, 121.69
See application file for complete search history.

(56) References Cited

U.S. PATENT DOCUMENTS

| | | |
|---|---|---|
| 3,720,784 A | 3/1973 | Maydan et al. |
| 4,000,492 A | 12/1976 | Willens |
| 4,752,455 A | 6/1988 | Mayer |
| 5,093,279 A | 3/1992 | Andreshak et al. |
| 5,104,480 A | 4/1992 | Wojnarowski et al. |
| 5,376,314 A | 12/1994 | Share et al. |
| 5,569,398 A | 10/1996 | Sun et al. |
| 5,589,085 A | 12/1996 | Mettes |
| 6,036,809 A | 3/2000 | Kelly et al. |
| 6,183,588 B1 | 2/2001 | Kelly et al. |
| 6,531,679 B2 | 3/2003 | Heerman et al. |
| 6,833,222 B1 * | 12/2004 | Buzerak et al. ............ 430/5 |
| 6,835,426 B2 * | 12/2004 | Duignan et al. ............ 427/596 |
| 6,876,784 B2 * | 4/2005 | Nikolov et al. ............ 385/11 |
| 6,936,311 B2 * | 8/2005 | Ringeisen et al. ............ 427/596 |
| 6,949,215 B2 | 9/2005 | Yamada et al. |
| 7,106,507 B2 | 9/2006 | Lee et al. |
| 7,176,053 B1 | 2/2007 | Dimmler |
| 7,220,371 B2 | 5/2007 | Suganuma |
| 7,332,263 B2 | 2/2008 | Addington et al. |

(Continued)

FOREIGN PATENT DOCUMENTS

JP    2009-220367    10/2009
WO    WO 2009/113411    9/2009

OTHER PUBLICATIONS

Grigoropoulos C. P., "Nano-structuring using pulsed laser radiation," in: Phipps, C. "Laser Ablation and its Applications" (New York: Springer: 2007), pp. 473-504.*

(Continued)

Primary Examiner — Thomas K Pham
Assistant Examiner — Cara Rakowski
(74) Attorney, Agent, or Firm — David S. Alavi

(57) ABSTRACT

A method comprises spatially selectively irradiating in a predetermined pattern with an output beam of a laser system an interface between a polymer substrate and a metal film on the polymer substrate. The polymer substrate is substantially transparent to the output beam of the laser system; the metal film absorbs a substantial fraction of the output beam. Laser system output comprises a sequence of pulses. Beam size at the polymer/metal interface, pulse energy, and pulse duration are selected so that each pulse from the laser system that irradiates an area of the polymer/metal interface substantially completely removes by ablation the metal film from at least a portion of the irradiated area without substantially altering the surfaces or bulk of the polymer substrate and without leaving on the polymer substrate or on remaining areas of the metal film substantial residue of metal that resolidified after being melted by the laser irradiation.

18 Claims, 2 Drawing Sheets

(56) References Cited

U.S. PATENT DOCUMENTS

| | | | |
|---|---|---|---|
| 7,692,860 B2 | 4/2010 | Sato et al. | |
| 2002/0125230 A1* | 9/2002 | Haight et al. | 219/121.69 |
| 2004/0152067 A1 | 8/2004 | Wang et al. | |
| 2008/0057632 A1* | 3/2008 | Arai et al. | 438/149 |
| 2008/0182349 A1* | 7/2008 | Yamazaki et al. | 438/29 |
| 2009/0052030 A1* | 2/2009 | Kaida et al. | 359/486 |

OTHER PUBLICATIONS

Ma, Y., et al. "Direct Fabrication of terahertz optical devices on low-absorption polymer substrates" Optics Letters, vol. 34 No. 10 (May 15, 2009), pp. 1555-1557.*

Hunger et al; "Multishot ablation of polymer and metal films at 248 nm"; Applied Surface Science, vol. 54, pp. 227-231 (1992).

Bolle et al; "Ablation of thin polymer films on Si or metal substrate with . . ."; Applied Surface Science, vol. 54, pp. 471-476, (1992).

Krüger et al; "Femtosecond-pulse laser processing of metallic and semiconducting thin films"; Laser-Induced Thin Film Processing; Proc. SPIE vol. 2403, p. 436 (1995).

Simon et al; "Machining of submicron structures on metals and semiconductors by ultrashort UV-laser pulses"; Applied Physics A, vol. 63, p. 505 (1996).

Nolte et al; "Ablation of metals by ultrashort laser pulses"; Journal of the Optical Society of America B, vol. 14, No. 10, pp. 2716-2722 ( Oct. 1997).

Yamada et al; "Mid-infrared wire-grid polarizer with silicides"; Optics Letters, vol. 33, No. 3, pp. 258-260 (Sep. 10, 2008).

Yamada et al; "Modeling, fabrication, and characterization of tungsten silicide wire-grid polarizer in infrared region"; Applied Optics, vol. 47, No. 26, pp. 4735-4738 (2008).

Strikwerda et al; "Comparison of birefringent electric split-ring resonator and meanderline structures . . ."; Optics Express, vol. 17, No. 1, pp. 136-149 (Jan. 5, 2009).

Ma et al; "Direct fabrication of terahertz optical devices on low-absorption polymer substrates"; Optics Letters, vol. 34, No. 10, pp. 1555-1557 (May 15, 2009).

International Search Report and Written Opinion dated Nov. 1, 2012 in counterpart App No. PCT/US2012/035067.

* cited by examiner

SINGLE-SHOT LASER ABLATION OF A METAL FILM ON A POLYMER MEMBRANE

BACKGROUND

The field of the present invention relates to spatially selective material processing using a laser. In particular, apparatus and methods are shown and described in which a laser system is employed to spatially selectively remove a metal coating from a polymer substrate without damaging the polymer substrate and without leaving resolidified molten metal residue on the substrate.

A wide variety of spatially selective material processing techniques have been developed, using lasers, applied to metal, applied to polymers, or applied to other materials. Selected examples include:

U.S. Pat. No. 3,720,784 entitled "Recording and display method and apparatus" issued Mar. 13, 1973 to Maydan et al;

U.S. Pat. No. 4,000,492 entitled "Metal film recording media for laser writing" issued Dec. 28, 1976 to Willens;

U.S. Pat. No. 4,752,455 entitled "Pulsed laser microfabrication" issued Jun. 21, 1988 to Mayer;

U.S. Pat. No. 5,093,279 entitled "Laser ablation damascene process" issued Mar. 3, 1992 to Andreshak et al;

U.S. Pat. No. 5,104,480 entitled "Direct patterning of metals over a thermally inefficient surface using a laser" issued Apr. 14, 1992 to Wojnarowski et al;

U.S. Pat. No. 5,569,398 entitled "Laser system and method for selectively trimming films" issued Oct. 29, 1996 to Sun et al;

U.S. Pat. No. 6,036,809 entitled "Process for releasing a thin-film structure from a substrate" issued Mar. 14, 2000 to Kelly et al;

U.S. Pat. No. 6,183,588 entitled "Process for transferring a thin-film structure to a substrate" issued Feb. 6, 2001 to Kelly et al;

U.S. Pat. No. 6,531,679 entitled "Method for the laser machining of organic materials" issued Mar. 11, 2003 to Heerman et al;

U.S. Pat. No. 6,833,222 entitled "Method and apparatus for trimming a pellicle film using a laser" issued Dec. 21, 2004 to Buzerak et al;

U.S. Pat. No. 6,949,215 entitled "Method for processing a three-dimensional structure by laser" issued Sep. 27, 2005 to Yamada et al;

U.S. Pat. No. 7,106,507 entitled "Flexible wire grid polarizer and fabricating method thereof" issued Sep. 12, 2006 to Lee et al;

U.S. Pat. No. 7,176,053 entitled "Laser ablation method for fabricating high performance organic devices" issued Feb. 13, 2007 to Dimmler;

U.S. Pat. No. 7,220,371 entitled "Wire grid polarizer and method for producing same" issued May 22, 2007 to Suganuma;

U.S. Pat. No. 7,332,263 entitled "Method for patterning an organic light emitting diode device" issued Feb. 19, 2008 to Addington et al;

U.S. Pat. No. 7,692,860 entitled "Wire grid polarizer and method of manufacturing the same" issued Apr. 6, 2010 to Sato et al;

E. Hunger, H. Pietsch, S. Petzoldt and E. Matthias; "Multi-shot ablation of polymer and metal films at 248 nm"; Applied Surface Science, Vol. 54, pp. 227-231 (1992);

Matthias Bolle and Sylvain Lazare; "Ablation of thin polymer films on Si or metal substrate with the low intensity UV beam of an excimer laser or mercury lamp: advantages of ellipsometric rate measurements"; Applied Surface Science, Vol. 54, pp. 471-476, (1992);

J. Krüger and W. Kautek; "Femtosecond-pulse laser processing of metallic and semiconducting thin films"; *Laser-Induced Thin Film Processing*, J. J. Dubowski, ed; Proc. SPIE Vol. 2403, p. 436 (1995);

P. Simon and J. Ihlemann; "Machining of submicron structures on metals and semiconductors by ultrashort UV-laser pulses"; Applied Physics A, Vol. 63, p. 505 (1996);

S. Nolte, C. Momma, H. Jacobs, A. Tünnermann, B. N. Chichkov, B. Wellegehausen, and H. Welling; "Ablation of metals by ultrashort laser pulses"; Journal of the Optical Society of America B, Vol. 14, No. 10, pp. 2716-2722 (October 1997);

Itsunari Yamada, Kenji Kintaka, Junji Nishii, Satoshi Akioka, Yutaka Yamagishi, and Mitsunori Saito; "Mid-infrared wire-grid polarizer with silicides"; Optics Letters, Vol. 33, No. 3, pp. 258-260 (10 Sep. 2008);

Itsunari Yamada, Junji Nishii, and Mitsunori Saito; "Modeling, fabrication, and characterization of tungsten silicide wire-grid polarizer in infrared region"; Applied Optics, Vol. 47, No. 26, pp. 4735-4738 (2008);

Andrew C. Strikwerda, Kebin Fan, Hu Tao, Daniel V. Pilon, Xin Zhang, and Richard D. Averitt; "Comparison of birefringent electric split-ring resonator and meanderline structures as quarter-wave plates at terahertz frequencies"; Optics Express, Vol. 17, No. 1, pp. 136-149 (5 Jan. 2009); and Yong Ma, A. Khalid, Timothy D. Drysdale, and David R. S. Cumming; "Direct fabrication of terahertz optical devices on low-absorption polymer substrates"; Optics Letters, Vol. 34, No. 10, pp. 1555-1557 (15 May 2009).

Maydan (U.S. Pat. No. 3,720,784) discloses use of pulsed output of a visible laser to form holes of varying sizes in a thin bismuth film on a transparent polyester film. Each hole is formed by a single pulse (3-20 nJ, 20-30 ns, 5-10 µm beam size), which heats the bismuth film to beyond its melting point (272° C.) over an area that is approximately proportional to the pulse energy, and surface tension draws the molten metal toward the periphery of the newly formed hole. The molten material resolidifies, leaving a crater-like rim around the hole. The size of each hole is determined by the area that was melted, hence by the energy delivered by the corresponding laser pulse.

Each of Dimmler (U.S. Pat. No. 7,176,053) and Addington (U.S. Pat. No. 7,332,263) discloses processing organic transistors or LEDs using UV lasers, in which all layers of a structure (e.g., metal, organic, and oxide) absorb the laser radiation and are melted.

SUMMARY

A method comprises spatially selectively irradiating in a predetermined pattern with an output beam of a laser system an interface between a polymer substrate and a metal coating on the polymer substrate. The polymer substrate is substantially transparent to the output beam of the laser system. Output of the laser system comprises a sequence of laser pulses. Beam size at the polymer/metal interface, pulse energy, and pulse duration of the laser system are selected so that each pulse from the laser system that irradiates an area of the polymer/metal interface substantially completely removes by ablation the metal film from at least a portion of the irradiated area without substantially altering the surfaces or bulk of the polymer substrate and without leaving on the polymer substrate substantial residue of metal that resolidified after being melted by the laser irradiation.

The polymer/metal interface can be irradiated through the polymer substrate. The polymer substrate can comprise a polymer membrane that is, e.g., less than about 100 μm thick, or less than about 10 μm thick or less than about 5 μm thick. Such a polymer membrane can be mechanically supported only at peripheral, non-irradiated portions thereof.

The metal coating can be, e.g., between about 1 nm and about 100 nm thick, or between about 5 nm and about 50 nm thick, and can comprise a metal or alloy with a melting point substantially greater than the melting point of the polymer substrate (e.g., chromium, gold, silver, copper, nickel, or others).

The output of the laser system can be characterized by a wavelength between about 500 nm and about 5 μm (e.g., 532 nm or 1064 nm), pulse duration less than about 100 ps (e.g., between about 10 ps and about 40 ps), pulse energy between about 0.1 μJ and about 5 μJ (e.g., between about 0.1 μJ and about 2 μJ), and a beam size between about 1 μm and about 100 μm (e.g., between about 10 μm and about 40 μm).

One example of the predetermined pattern comprises a series of substantially parallel, substantially uniformly spaced lines, so that the portion of the metal layer that remains on the polymer membrane after irradiation comprises a series of substantially parallel, substantially uniformly spaced metal filaments on the polymer membrane. The metal filaments can have a spacing, e.g., between about 5 μm and about 50 μm, or between about 10 μm and about 30 μm. The metal filaments on the polymer membrane can function as a wire grid polarizer for radiation having a frequency, e.g., between about 1 THz and about 50 THz, or between about 1 THz and about 10 THz.

Objects and advantages pertaining to spatially selective removal of a metal coating from a polymer substrate may become apparent upon referring to the exemplary embodiments illustrated in the drawings and disclosed in the following written description or appended claims.

The embodiments shown in the Figures are exemplary, and should not be construed as limiting the scope of the present disclosure or appended claims.

DETAILED DESCRIPTION OF EMBODIMENTS

Figure 1:
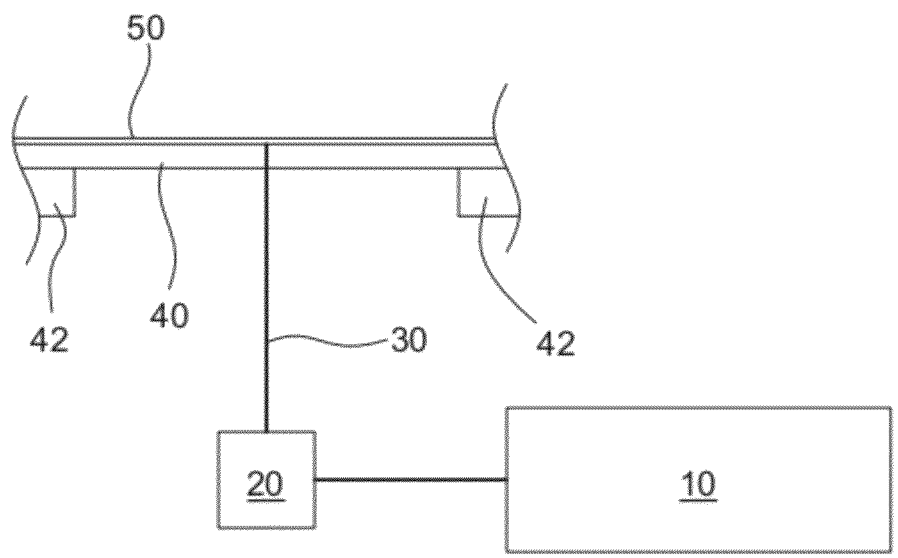
FIG. 1 is a schematic diagram of a laser source and a beam steering mechanism for spatially selective irradiation of a metal film on a polymer membrane.

A method comprises spatially selectively irradiating, in a predetermined pattern with an output beam 30 of a laser system 10, an interface between a polymer substrate 40 and a metal film or coating 50 on the polymer substrate 40 (FIG. 1), in order to remove the metal film from those areas that are irradiated. The polymer substrate 40 is substantially transparent to the output beam 30 of the laser system 10, while the metal film 50 absorbs at least a substantial fraction of the incident output beam 30. The output of the laser system comprises a sequence of laser pulses. The beam size at the polymer/metal interface, pulse energy, and pulse duration of the laser system are selected so that each pulse from the laser system that irradiates an area of the polymer/metal interface substantially completely removes by ablation the metal film from at least a portion of the irradiated area, but does not substantially alter the surfaces or bulk of the polymer substrate and does not leave behind on the polymer substrate or on remaining areas of the metal film substantial residue of metal that resolidified after being melted by the laser irradiation.

In typical examples, the output of the laser system can be characterized by a wavelength between about 500 nm and about 5 μm, pulse duration less than about 100 ps (usually defined as full width at half maximum of the temporal intensity profile, i.e., FWHM), pulse energy between about 0.1 μJ and about 5 μJ, and a beam size (at the irradiated polymer/metal interface) between about 1 μm and about 50 μm (usually defined as the distance between the $1/e^2$ points of the spatial intensity profile, i.e., $FW1/e^2$). The pulse repetition rate typically is between about 100 kHz and about 1 MHz, although any available, suitable, desired, or needed repetition rate can be employed. Such parameters are readily met by a variety of commercially available laser sources. A diode-pumped, modelocked fiber laser operating in the near infrared can be employed to produce laser output at wavelengths between about 1000 nm and about 1100 nm, for example. In other examples frequency doubling, and fiber amplifiers if needed or desired, can be further employed to produce laser output at wavelengths between about 500 nm and about 550 nm. One specific example includes a fundamental wavelength of 1064 nm or a second harmonic wavelength of 532 nm, pulse duration of about 30 ps, pulse energy between about 0.1 μJ and about 2 μJ, a pulse repetition rate of about 200 kHz, and a beam size (at the metal/polymer interface) between about 10 μm and about 40 μm. All laser parameters given are exemplary; laser systems exhibiting other performance parameters can be employed within the scope of the present disclosure or appended claims.

One common example of a metal/polymer system that can be spatially patterned using methods disclosed herein comprises a nickel coating on a polyester membrane substrate. For example, Mylar® film (i.e., biaxially oriented polyethylene terephthalate or BoPET) less than about 100 μm thick (e.g., less than about 10 μm or about 5 μm thick) can be coated with a nickel film between about 1 and about 100 nm thick (e.g., between about 5 nm and about 50 nm thick). Metal film thicknesses are typically estimated by measuring optical transmission of the metal film.

Any suitable polymer substrate or membrane can be employed; the polymer membrane or substrate should be substantially transparent at the wavelength of the output beam of the laser system used to process the metal film. Examples of suitable polymer substrates or membranes can include Mylar® or other polyesters, nitrocellulose, cellulose acetate or other cellulose esters, polyethylene, various fluoropolymers, and so on; other examples include any polymers suitable for making pellicles. Any suitable metal or alloy film or coating can be employed; the metal or alloy film or coating should absorb a significant fraction of the incident pulses from the laser system. Examples can include silver, gold, tungsten, copper, chromium, molybdenum, nickel, titanium, and so on.

Figure 2A:
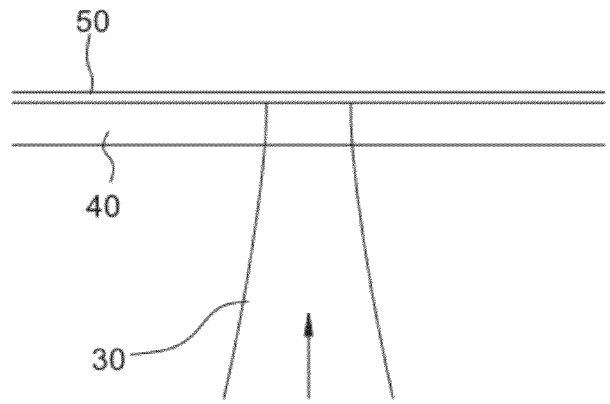
FIGS. 2A, 2B, and 2C illustrate schematically irradiation of a polymer/metal interface and ablative removal of the metal from the polymer.
Figure 2B:
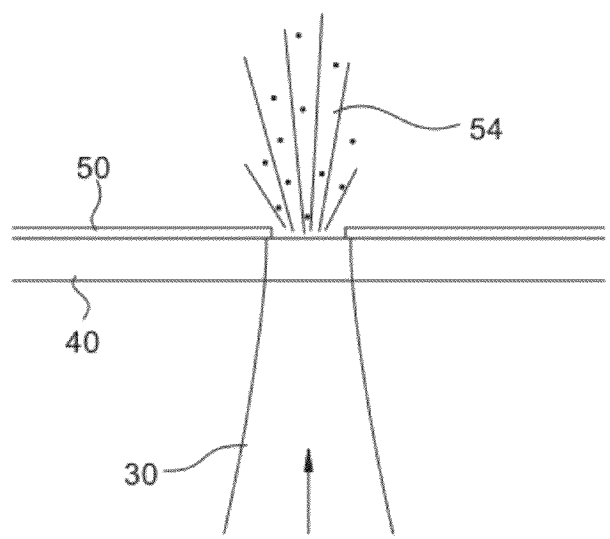
Figure 2C:
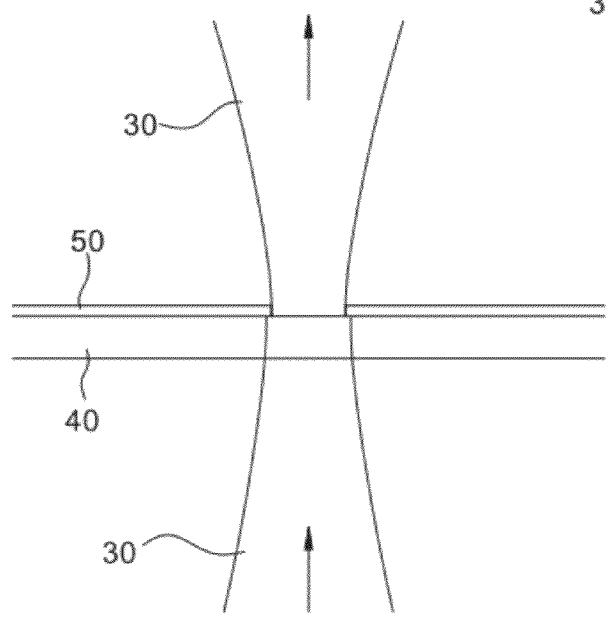

In a preferred arrangement, pulses from the laser system propagate through the polymer substrate or membrane 40 and are focused to achieve the desired beam size at the polymer/metal interface (FIGS. 2A-2C). The polymer/metal interface can be, but need not be, positioned at the focus of the beam 30 (i.e., at the beam's minimum size). The polymer/metal interface can be irradiated from the other side instead (i.e., from the side bearing the metal film 50), if desired or if the polymer side of the polymer/metal interface is obstructed. The transparency of the polymer at the laser wavelength ensures that the laser pulse does not substantially alter (e.g., melt, damage, or otherwise alter) the surfaces or bulk of the polymer material. The high peak power density of each laser pulse (e.g., 1 µJ in 30 ps in a 10 µm irradiated spot yields a peak power density of about 10 $GW/cm^2$) enables substantially complete removal by ablation of the metal film 50 from at least a central portion of the area of the polymer membrane 40 irradiated by that pulse (FIG. 2B); at the beam size and pulse energy typically employed, a single pulse typically removes the metal substantially completely from all but the edges of the irradiated area. It is not clear if melting is involved in the ablation process; what is clear is that no substantial residue of metal that resolidified after being melted by the laser irradiation remains on the polymer membrane 40 or on remaining areas of the metal film 50 (FIG. 2C). This is in distinct contrast with the ablation process of Maydan (U.S. Pat. No. 3,720,784), which discloses holes formed in a metal film that are surrounded by crater-like rims of resolidified molten metal.

Although silent on this point, the process of Maydan must necessarily result in some damage or alteration of the polymer membrane. The bismuth metal film disclosed has a melting point of 272° C., which is greater than the melting point of the underlying Mylar® membrane (254° C.). The presence of molten bismuth on the Mylar® membrane means that some portion of the polymer membrane surface must melt as well, leaving its surface damaged. Such damage might be acceptable in the context of the Maydan disclosure, but may not be acceptable in other contexts (e.g., forming a transmissive element such as a wire-grid polarizer, or forming a flexible electronic circuit or solar cell).

It may be desirable to employ metal or alloy coatings that have melting points substantially higher than that of the polymer substrate or membrane. Accordingly, the metal film can comprise, e.g., chromium (mp 1907° C.), gold (mp 1064° C.), silver (mp 962° C.), copper (mp 1085° C.), nickel (mp 1455° C.), tungsten (mp 3422° C.), molybdenum (mp 2623° C.), titanium (mp 1668° C.), or other metal with a sufficiently high melting point. Use of metallic materials having relatively high melting points (e.g., greater than about 500° C., or greater than about 700° C.) may reduce the likelihood that metal melted by the laser irradiation will remain on the polymer membrane or substrate to resolidify, and that in turn reduces the likelihood of damage to the polymer substrate or membrane by such molten material and the heat it would release into the polymer upon resolidifying. That feature can be particularly desirable when spatially patterning a metal coating on a thin polymer membrane (e.g., less than 100 µm thick, or less than about 5 or 10 µm thick). Any heat dissipated into the polymer membrane from molten metal would result in a correspondingly larger temperature rise in a thinner polymer film, increasing the likelihood that such heat dissipation might result in melting of the membrane. Eliminating such dissipation of heat (by substantially eliminating the presence of molten metal on the polymer membrane) reduces the likelihood of damage to the membrane by melting during spatial patterning of the metal coating. Also, by substantially preventing resolidification of molten metal on the polymer substrate, a clean, sharp edge can be formed between the remaining metal coating and the area of the polymer surface exposed by ablation of the metal coating (e.g., as in FIG. 3).

Metal ablation methods disclosed herein are suitable for creating a spatial pattern in a metal film on a polymer substrate, particularly thin polymer membranes (e.g., less than 100 µm thick, or less than about 5 or 10 µm thick). In a typical arrangement, such a thin polymer membrane is mechanically supported only at peripheral, non-irradiated portions thereof. For example, the polymer membrane 40 can be supported by a substantially rigid frame or ring 42 (FIG. 1), with the membrane secured to and supported by the frame of ring only at peripheral portion of the membrane. A central portion of the membrane (i.e., within the frame or ring) would be unobstructed by the frame or ring and therefore exposed to enable irradiation by the laser system. After irradiating, the resulting polymer membrane with the spatially patterned metal coating can remain secured to and supported by the frame or ring, or can be removed and remounted on another structure, as needed or desired.

As noted above, the metal film can be spatial selectively removed by directly irradiating it with the output pulses of the laser system (i.e., without irradiating the polymer/metal interface or propagating the beam through the polymer membrane until the metal coating is removed). In that arrangement, the entire thickness of the metal coating must be ablated by the laser pulse to substantially completely remove it from the irradiated area of the polymer. On the other hand, by propagating the laser pulses through the polymer substrate and irradiating the polymer/metal interface from that side, initial ablation of the metal in contact with the polymer can cause that portion of the metal coating to act as a release layer. Once the portion of the metal coating that adheres to the polymer surface is ablated, the metal above it can be expelled from the polymer surface (FIG. 2B, which illustrates schematically a plume 54 of ejected metal). This can have the desirable effect of reducing the pulse energy required for substantially complete removal of the irradiated metal coating, in turn further reducing the likelihood of undesirable damage or other alteration of the polymer membrane by the laser pulse.

The so-called "back-side" ablation (i.e., "lift-off" process) described in the previous paragraph enables additional spatial patterning using laser pulses. One or more additional layers can be arranged on at least a portion of the metal coating, i.e., with the metal coating between the polymer substrate and the additional layer(s). Spatially selectively irradiating the polymer/metal interface (through the polymer) and resultant ablation of the metal layer can also cause spatially selective removal of the one or more additional layers from the irradiated areas. The metal coating acts as a laser-activated release layer and enables spatial patterning with the laser of the one or more additional layers, including layers of material that might not otherwise be removed by the laser pulses. The laser-based spatial patterning methods disclosed or claimed herein can be used to fabricate a variety of structures on a polymer substrate or membrane, e.g., electronic circuits, photoelectric or photovoltaic components, thin film transistors or diodes, MEMS structures, and so forth. The one or more additional layers can include one or more semiconductor layers, dielectric layers, insulating layers, conductive layers, metal layers, polymer layers, crystalline layers, glassy layers, organic layers, inorganic layers, or other suitable material layers, alone or in combination, to form the desired structure or component.

The use of a thin metal coating as a laser-activated release layer, as described in the previous paragraph, can also enable spatial patterning of the overlaid layers without melting those layers. The spatial patterning methods disclosed herein can therefore be advantageously employed to pattern layers which would be damaged or deactivated by melting near patterned edges, e.g., semiconducting films used for solar cells. In contrast, methods disclosed by Maydan, Dimmler, and Addington result in melting of the materials removed from the substrate.

A high pulse repetition rate, and the substantially complete removal of the metal coating by a single laser pulse, enables rapid "writing" of spatial patterns using the methods disclosed or claimed herein. For example, a beam size of about 10 to 40 µm and a laser pulse repetition rate of about 100 to 200 kHz can yield a linear "write rate" on the order of several meters per second. It should be noted that to achieve the desired spatially selective irradiation of the polymer/metal interface, one or both of the polymer substrate or the laser beam can be moved relative to the other. In one example, the polymer substrate or membrane (with the metal coating) can be held stationary while the laser beam is scanned across it in the desired spatial pattern by motion-controlled beam steering components (e.g., stepper- or servo-driven rotating mirrors or translating lenses, mirrors mounted on galvanometers, or other suitable arrangement). In another example, the laser beam is directed to a fixed location, and the polymer substrate with the metal coating is scanned according to the desired spatial pattern (e.g., mounted on a stepper- or servo-driven two-axis translator). Either of those scenarios can be referred to as "beam scanning," and a mechanism 20 is generically represented in FIG. 1 for such beam scanning. In both of those examples, a shutter or modulator can be employed to block or pass the laser beam in a controlled manner, to enable removal of the metal coating from discontiguous areas of the polymer substrate or membrane, if needed or desired.

Figure 3:
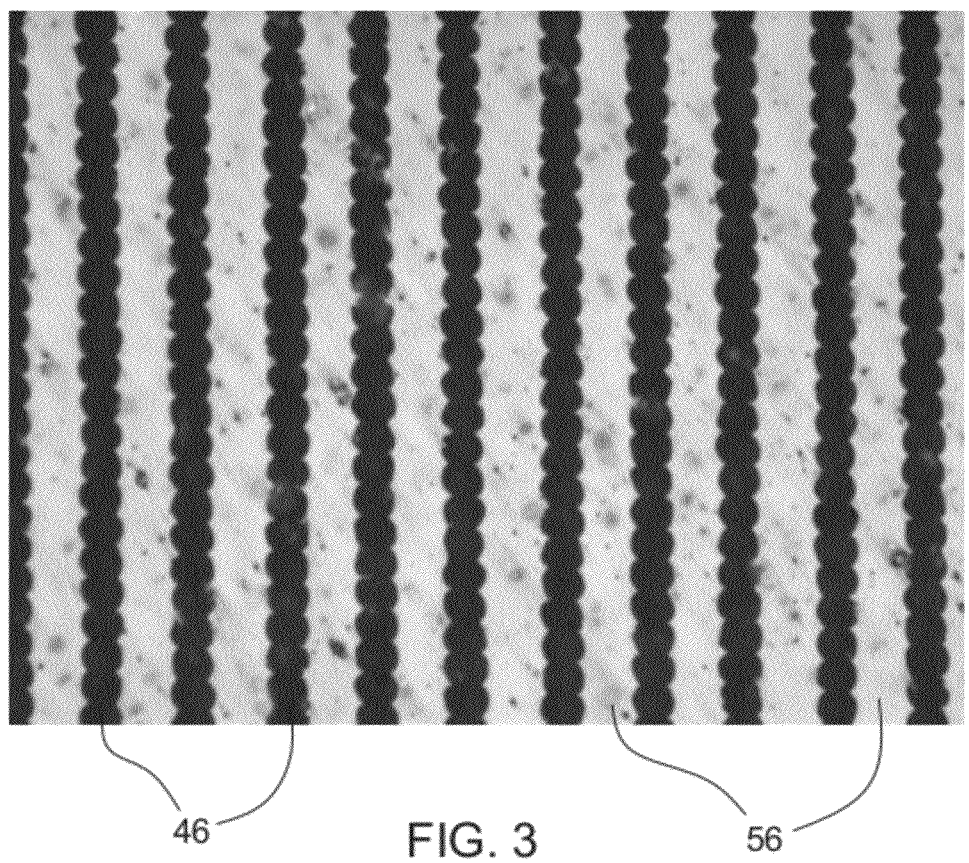
FIG. 3 is a micrograph of a polymer film from which a metal film has been removed from parallel lines by laser irradiation.

The methods disclosed or claimed herein can be employed to produce any suitable or desired spatial pattern of the metal film on the polymer membrane, by irradiating the polymer/metal interface according to a corresponding, predetermined spatial pattern. In one example, the predetermined pattern of irradiation comprises a series of substantially parallel, substantially uniformly spaced lines 46, so that the portion of the metal layer 50 that remains on the polymer membrane 40 after irradiation comprises a series of substantially parallel, substantially uniformly spaced metal filaments 56 on the polymer membrane 40 (FIG. 3). Any desired line width or line spacing (i.e., distance from the center of one line to the center of the next one) can be produced, limited by the minimum achievable beam size (limited by wavelength and the laser beam quality in the standard way) and the minimum spatial resolution of the beam scanning apparatus. Line spacings less than about 50 µm, less than about 30 µm, or less than about 20 µm have been demonstrated, and smaller spacings can be readily achieved. As seen in FIG. 3, the edges of such filaments may be scalloped due to a round beam profile of the irradiating beam. If needed or desired, that scalloped shape can be reduced by irradiating with more closely spaced pulses, or by employing beam-shaping optical components to form a more suitable beam profile, e.g., somewhat rectangular.

Thin polymer films (e.g., less than about 10 µm or about 5 µm) having such patterns of uniformly spaced metal filaments can function well as wire grid polarizers for so-called terahertz radiation. In that frequency regime (i.e., from about 1 THz up to 10 or even 20 THz), the thin film reduces or substantially eliminates Fabry-Perot effects arising from reflections at the membrane surfaces. Such a wire grid having a spacing of about 30 µm can polarize radiation at frequencies up to about 10 THz. Other spacings can be employed for other frequency ranges within the scope of the present disclosure or appended claims. Likewise, other spatial patterns yielding other optical, electronic, or mechanical functionality can be employed within the scope of the present disclosure or appended claims.

It is intended that equivalents of the disclosed exemplary embodiments and methods shall fall within the scope of the present disclosure or appended claims. It is intended that the disclosed exemplary embodiments and methods, and equivalents thereof, may be modified while remaining within the scope of the present disclosure or appended claims.

In the foregoing Detailed Description, various features may be grouped together in several exemplary embodiments for the purpose of streamlining the disclosure. This method of disclosure is not to be interpreted as reflecting an intention that any claimed embodiment requires more features than are expressly recited in the corresponding claim. Rather, as the appended claims reflect, inventive subject matter may lie in less than all features of a single disclosed exemplary embodiment. Thus, the appended claims are hereby incorporated into the Detailed Description, with each claim standing on its own as a separate disclosed embodiment. However, the present disclosure shall also be construed as implicitly disclosing any embodiment having any suitable combination of disclosed or claimed features (i.e., combinations of features that are not incompatible or mutually exclusive) that appear in the present disclosure or the appended claims, including those combinations of features that may not be explicitly disclosed herein. It should be further noted that the scope of the appended claims do not necessarily encompass the whole of the subject matter disclosed herein.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. For purposes of the present disclosure or appended claims, the words "comprising," "including," "having," and variants thereof, wherever they appear, shall be construed as open ended terminology, with the same meaning as if the phrase "at least" were appended after each instance thereof.

In the appended claims, if the provisions of 35 USC §112 ¶ 6 are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC §112 ¶ 6 are not intended to be invoked for that claim.

What is claimed is:

1. A method comprising spatially selectively irradiating in a predetermined pattern with an output beam of a laser system an interface between a polymer membrane and a metal film on the polymer membrane, wherein:
   (a) the polymer membrane is less than about 10 µm thick and is substantially transparent to the output beam of the laser system;
   (b) output of the laser system comprises a sequence of pulses; and
   (c) the output of the laser system is characterized by wavelength between about 500 nm and about 1100 nm, pulse duration less than about 50 ps, pulse energy between about 0.1 µJ and about 2 µJ, and beam size between about 10 µm and about 40 µm at the polymer/metal interface so that each pulse from the laser system that irradiates an area of the polymer/metal interface substantially completely removes by ablation the metal film from at least a portion of the irradiated area without substantially altering surfaces or bulk of the polymer membrane and without leaving on the polymer membrane or on remaining areas of the metal film substantial residue of metal that resolidified after being melted by laser irradiation.

2. The method of claim 1 wherein the polymer/metal interface is irradiated by the pulses through the polymer membrane.

3. The method of claim 1 wherein the polymer membrane comprises a polyester membrane.

4. The method of claim 1 wherein the polymer membrane is mechanically supported only at peripheral, non-irradiated portions thereof.

5. The method of claim 1 wherein the metal film comprises a metal or alloy with a melting point greater than about 500° C.

6. The method of claim 1 wherein the metal film comprises a metal or alloy with a melting point greater than about 700° C.

7. The method of claim 1 wherein the metal film comprises chromium, gold, silver, copper, nickel, tungsten, titanium, or molybdenum.

8. The method of claim 1 wherein the metal film is less than about 100 nm thick.

9. The method of claim 1 wherein the metal film is between about 5 nm and about 50 nm thick.

10. The method of claim 1 wherein one or more additional layers are arranged on at least a portion of the metal film, and spatially selectively irradiating the polymer/metal interface removes the additional layers, without substantial melting of the additional layers, from those areas of the polymer/metal interface from which the metal film is ablatively removed.

11. The method of claim 10 wherein the one or more additional layers include one or more semiconductor layers, dielectric layers, insulating layers, conductive layers, metal layers, polymer layers, crystalline layers, glassy layers, organic layers, or inorganic layers.

12. A method comprising spatially selectively irradiating in a predetermined pattern with an output beam of a laser system an interface between a polymer substrate and a metal film on the polymer substrate, wherein:
    (a) the polymer substrate is substantially transparent to the output beam of the laser system;
    (b) output of the laser system comprises a sequence of pulses;
    (c) beam size at the polymer/metal interface, pulse energy, and pulse duration of the laser system are selected so that each pulse from the laser system that irradiates an area of the polymer/metal interface substantially completely removes by ablation the metal film from at least a portion of the irradiated area without substantially altering surfaces or bulk of the polymer substrate and without leaving on the polymer substrate or on remaining areas of the metal film substantial residue of metal that resolidified after being melted by laser irradiation;
    (d) the polymer/metal interface is irradiated by the pulses through the polymer substrate;
    (e) the polymer substrate comprises a polyester membrane that is less than about 10 μm thick;
    (f) the polymer membrane is mechanically supported only at peripheral, non-irradiated portions thereof;
    (g) the metal film comprises chromium, gold, silver, copper, nickel, tungsten, titanium, or molybdenum, and is between about 5 nm and about 50 nm thick; and
    (h) the output of the laser system is characterized by a wavelength of 532 nm or 1064 nm, pulse duration less than about 100 ps, pulse energy between about 0.1 μJ and about 2 μJ, and a beam size between about 10 μm and about 100 μm.

13. The method of claim 12 wherein the predetermined pattern comprises a series of substantially parallel, substantially uniformly spaced lines, so that a portion of the metal film that remains on the polymer membrane after irradiation comprises a series of substantially parallel, substantially uniformly spaced metal filaments on the polymer membrane.

14. The method of claim 13 wherein the metal filaments have a spacing between about 5 μm and about 50 μm.

15. The method of claim 14 wherein the metal filaments on the polymer membrane function as a wire grid polarizer for radiation of a frequency between about 1 THz and about 20 THz.

16. The method of claim 14 wherein the metal filaments have a spacing between about 10 μm and about 30 μm.

17. The method of claim 16 wherein the metal filaments on the polymer membrane function as a wire grid polarizer for radiation of a frequency between about 1 THz and about 10 THz.

18. A wire grid polarizer fabricated by the method of claim 14.

* * * * *